United States Patent
Chen et al.

(10) Patent No.: US 10,731,721 B2
(45) Date of Patent: Aug. 4, 2020

(54) ELASTIC ADJUSTABLE BRAKE PAD FOR USE IN TRAIN

(71) Applicant: BEIJING BEI MO GAO KE FRICTION MATERIAL CO. LTD, Beijing (CN)

(72) Inventors: Jianfeng Chen, Beijing (CN); Changkun Yang, Beijing (CN); Xiang Zhao, Beijing (CN); Kai Xiao, Beijing (CN); Dan Zheng, Beijing (CN); Guangyu Li, Beijing (CN); Hua Feng, Beijing (CN); Xiaohua Liu, Beijing (CN); Yan Wang, Beijing (CN); Zhiwei Liu, Beijing (CN); Longjie Han, Beijing (CN); Xueqiang Li, Beijing (CN); Zhen Xiao, Beijing (CN); Hongbo Yang, Beijing (CN)

(73) Assignee: BEIJING BEI MO GAO KE FRICTION MATERIAL CO. LTD, Beijing (CN)

( * ) Notice: Subject to any disclaimer, the term of this patent is extended or adjusted under 35 U.S.C. 154(b) by 45 days.

(21) Appl. No.: 15/761,511

(22) PCT Filed: Apr. 20, 2017

(86) PCT No.: PCT/CN2017/080333
§ 371 (c)(1),
(2) Date: Mar. 20, 2018

(87) PCT Pub. No.: WO2018/000895
PCT Pub. Date: Jan. 4, 2018

(65) Prior Publication Data
US 2018/0266508 A1    Sep. 20, 2018

(30) Foreign Application Priority Data

Jun. 30, 2016 (CN) .................. 2016 2 0680150 U

(51) Int. Cl.
*F16D 69/04* (2006.01)
*F16D 65/847* (2006.01)
(Continued)

(52) U.S. Cl.
CPC ........... *F16D 69/04* (2013.01); *F16D 65/847* (2013.01); *B61H 5/00* (2013.01); *F16D 65/092* (2013.01);
(Continued)

(58) Field of Classification Search
CPC ................... F16D 69/04; F16D 65/092; F16D 2069/0433; F16D 65/847; F16D 69/0408;
(Continued)

(56) References Cited

U.S. PATENT DOCUMENTS 8,215,461 B2 * 7/2012 Holme ................ F16D 69/0408
188/250 G
9,394,953 B2 * 7/2016 Kato ........................ B61H 5/00
(Continued)

FOREIGN PATENT DOCUMENTS

AT      307303      11/2005
CN      201606435   10/2010
(Continued)

OTHER PUBLICATIONS

International Search Report for PCT/CN2017/080333, dated Jul. 20, 2017, 6 pages.
(Continued)

*Primary Examiner* — Pamela Rodriguez
(74) *Attorney, Agent, or Firm* — Nixon & Vanderhye P.C.

(57) ABSTRACT

An elastic adjustable brake pad for use in a train, comprising a brake pad frame (1) provided with a fourth through hole (18), a brake block assembly, and a spiral compression spring (6); the brake block assembly comprises a brake block (16), a rivet (4), a Belleville spring (5), and a rivet
(Continued)

sleeve (3), the brake block (16) comprising a friction block (10) and a static sheet steel back (7) fixedly mounted together, the rivet (4) passing through the brake block (16) and being sleeved in turn by the Belleville spring (5) and the rivet sleeve (3); the fourth through hole (18) is a stepped counterbore, and the rivet (4) in the brake block (16) penetrates the fourth through hole (18) and extends outward therefrom, the spiral compression spring (6) being sleeved over the outside of the rivet sleeve (3), and the outer side of one end of the rivet sleeve (3) being provided with a clamping groove clamped to an elastic retainer ring (2), one end of the spiral compression spring (6) abutting a step on which a secondary counterbore (20) is located, and the other end thereof abutting the lower end face of the elastic retainer ring (2); a plurality of anti-rotation pins are arranged between the static sheet steel back (7) and the brake pad frame (1). The present brake pad has the advantages of automatically adjusting the brake clearance, ensuring the friction area at all times, improving brake efficiency, extending service life, and low manufacturing costs.

10 Claims, 14 Drawing Sheets

(51) Int. Cl.
  *B61H 5/00* (2006.01)
  *F16D 65/092* (2006.01)
  *F16D 65/78* (2006.01)
  *F16D 69/00* (2006.01)
(52) U.S. Cl.
  CPC .... *F16D 69/0408* (2013.01); *F16D 2065/785* (2013.01); *F16D 2069/005* (2013.01); *F16D 2069/006* (2013.01); *F16D 2069/0433* (2013.01); *F16D 2200/0021* (2013.01); *F16D 2200/0026* (2013.01); *F16D 2250/0061* (2013.01); *F16D 2250/0069* (2013.01)

(58) Field of Classification Search
  CPC ......... F16D 2065/785; F16D 2069/005; F16D 2200/0021; F16D 2200/0026; F16D 2250/0061; F16D 2250/0069; B61H 5/00
  USPC ..... 188/251 R, 250 R, 250 B, 250 G, 250 E, 188/257, 258, 259, 153 R
  See application file for complete search history.

(56) References Cited

U.S. PATENT DOCUMENTS 10,030,725 B2 * 7/2018 Kato .................... F16D 65/092
2015/0285321 A1 * 10/2015 Maehara ................. B61H 5/00
                                                         188/250 G

FOREIGN PATENT DOCUMENTS

| CN | 104482079 | 4/2015 |
| CN | 204419934 | 6/2015 |
| CN | 205278176 | 6/2016 |
| CN | 105952828 | 9/2016 |
| CN | 205806293 | 12/2016 |
| WO | WO 2012/081641 A1 | 6/2012 |

OTHER PUBLICATIONS

Supplementary European Search Report dated May 21, 2019 in European Application No. 17818892.6, 6 pages.

* cited by examiner

ELASTIC ADJUSTABLE BRAKE PAD FOR USE IN TRAIN

This application is the U.S. national phase of International Application No. PCT/CN2017/080333 filed 20 Apr. 2017, which designated the U.S. and claims priority to CN Patent Application No. 201620680150.6 filed 30 Jun. 2016, the entire contents of each of which are hereby incorporated by reference.

TECHNICAL FIELD

The present application relates to the technical field of trains, and specifically to an elastic adjustable brake pad for a train.

BACKGROUND

In the prior art, a friction braking structure of a train converts kinetic energy into heat energy via friction and emits the heat energy to the air. At present, disc brake systems are adopted in high-speed trains. The disc brakes are divided into a wheel disc brake and an axle disc brake, where the wheel disc brake is implemented by directly using the exterior of a wheel as a brake disc, and the axle disc brake is implemented by a brake disc mounted on an axle. In both of these disc brake structures, brake pads are distributed on both sides of the brake disc. When the train runs, the brake disc, which is integrally connected with the wheel disc or axle disc of the train, rotates at a high speed along with the axle, and the brake pad is static relatively; and to brake the train, a hydraulic ram cylinder transfers pressure to the brake pad, thereby compressing the brake disc to produce a braking torque for braking.

At present, the brake pads for trains are mainly divided into integrated ones and split ones. The integrated brake pad is formed by connecting a friction material with a brake pad frame; and the split brake pad is formed by sintering a friction material with a steel back into a friction block and then connecting the friction block with a brake pad frame via a clamping spring, a pressure spring, a rivet and the like structure. The integrated brake pad has features of simple structure and manufacturing process, while the split brake pad has features of convenience in disassembly and assembly, use and maintenance and the like, meanwhile, the split brake pad can further have the function of gap adjusting by an appropriate design, so that the surface of the friction material of the brake pad is in better contact with the surface of the brake disc during braking to improve the braking efficiency.

A train brake pad structure with an adjustor is disclosed, where the components of the brake pad structure adopt an elastic contact and a floating connection, and the friction block is connected with the brake pad frame via a clamping spring, with an adjustor being mounted therebetween, and both the steel back for the friction block and the adjustor adopt a spherical structure, which is beneficial to adjusting the friction surface. After the friction block of the structure is worn, only the friction block is replaced, and the other parts can be reused, so that the structure has advantages that the brake pad is convenient to maintain and the friction block is convenient to replace. The structure has the disadvantages that the steel back for the friction block and the adjustor which have the spherical structures need to be casted, thus the external cooperative machining cost is increased and the friction material is inconvenient to sinter.

A brake pad for a train is further disclosed, its brake pad frame is also movably connected with the brake block, and the brake pad can adjust the contact area between the surface of the friction material of the friction block and the surface of the brake disc to improve the braking efficiency by a Belleville spring, but it is defective for requiring for high machining precision of its parts; although the contact area between the surface of each friction block and the surface of the brake disc can be adjusted individually, the friction areas of different brake blocks become different after a period of time in use, and the friction areas of all the brake blocks cannot be ensured to be consistent or coordinative even by respective adjustment, thus the service life of the whole brake pad is shortened and the braking efficiency is affected.

SUMMARY OF THE INVENTION

In order to overcome the defects in the prior art, the present invention provides an elastic adjustable brake pad for a train, which can ensure the friction area at any moment, improve the braking efficiency and prolong the service life.

The present invention adopts the following technical solution for solving the problems: an elastic adjustable brake pad includes a brake pad frame provided with 18 fourth through holes, the brake pad frame is of a semi-ring plate structure, connection parts bent towards the center line of the semi-ring plate structure are respectively formed on the inner lateral surface and the outer lateral surface of the semi-ring plate structure, a semicircular groove having an opening towards the center line of the semi-ring plate structure is formed in the center of a side surface of each of the connection parts, both ends of the brake pad frame are of arc-shaped structures, a first through hole is formed in the center of each of the arc-shaped structures, each of the arc-shaped structures is provided with a second through hole adjacent to its inner side, two square third through holes are formed at the center of the brake pad frame, and the brake pad further includes a brake block assembly and a spiral compression spring; the brake block assembly includes a brake block, a rivet, a Belleville spring and a rivet sleeve; the brake block includes a friction block and a static sheet steel back which are fixedly mounted together, a mounting hole for mounting the rivet is formed in the center of the brake block, and the tail of the rivet protrudes from a surface of the brake block where the static sheet steel back is located, and then is sequentially extended through the Belleville spring and the rivet sleeve; the fourth through holes are stepped counterbores, and the stepped counterbore is formed by providing a secondary counterbore in a primary counterbore; the rivet sleeve in each brake block assembly is extended through the fourth through hole and out of the primary counterbore, the spiral compression spring is disposed surrounding the rivet sleeve, a clamping groove for clamping an elastic check ring is formed in the outer side of one end of the rivet sleeve, one end of the spiral compression spring abuts against the step where the secondary counterbore is located, and the other end of the spiral compression spring abuts against the lower end face of the elastic check ring; and a plurality of anti-rotation pins are arranged between the static sheet steel back and the brake pad frame.

Further, the anti-rotation pins are arranged in anti-rotation pin holes, which each are formed by positioning holes in the static sheet steel back and blind holes in the brake pad frame which are corresponding to the positioning holes.

Further, the static sheet steel back is provided with a plurality of the positioning holes, which are evenly distributed around the center of the static sheet steel back; and in the brake block assembly, the positioning holes are located outside the circumference of the Belleville spring.

Further, the friction block and the static sheet steel back are gengons corresponding to each other, which each have five lateral surfaces, one of which is a convex cambered surface, and the other four of which are planes.

Further, anti-wear grains are formed on the outside end face of the friction block.

Further, the anti-wear grains on the outside end face of the friction block are distributed radially with the center of the friction block as a center.

Further, the friction block and the static sheet steel back are bonded together by sintering to form the brake block.

Further, the side length of the friction block is shorter than that of the static sheet steel back.

Further, the friction block is made of a metal-based powder material.

Further, the metal-based powder material is a copper-based metallurgical powder material.

An elastic adjustable brake pad for a train includes a brake pad frame, the brake pad frame is of a semi-ring plate structure, connection parts bent towards the center line of the semi-ring plate structure are respectively formed on the inner lateral surface and the outer lateral surface of the semi-ring plate structure, a semicircular groove having an opening towards the center line of the semi-ring plate structure is formed in the center of a side surface of each of the connection parts, both ends of the brake pad frame are of arc-shaped structures, a first through hole is formed in the center of each of the arc-shaped structures, each of the arc-shaped structures is provided with a second through hole adjacent to its inner side, a third through hole is formed at the center of the brake pad frame, and the brake pad is characterized by further including a heat insulation structure, wherein:

the heat insulation structure includes a brake block, a Belleville spring, as well as a heat insulation washer and a gasket between the brake block and the Belleville spring, a boss integrated with the gasket is formed on a surface of the gasket which faces the Belleville spring, the inner diameter of the boss is greater than or equal to the outer diameter of the Belleville spring, the height of the boss is smaller than a first thickness and greater than a thickness variation, where the first thickness refers to the thickness of the Belleville spring under the maximum compression, and the thickness variation is a difference between the first thickness and a second thickness which is the thickness of the Belleville spring when it is not compressed.

Further, the heat insulation washer includes a first heat insulation washer and a second heat insulation washer, the first heat insulation washer is located between the Belleville spring and the gasket, and the second heat insulation washer is located between the brake block and the gasket.

Further, the first heat insulation washer is matched with the Belleville spring in shape, and the second heat insulation washer is matched with the brake block in shape.

Further, the first heat insulation washer is the same as the Belleville spring in shape, and the second heat insulation washer is the same as the brake block in shape.

Further, the heat insulation washer and the gasket are made of materials having heat conduction coefficients smaller than a threshold.

Further, the brake pad frame is connected with the gasket by a first anti-rotation pin, the gasket is connected with the brake block by a second anti-rotation pin, and the position for coupling the first anti-rotation pin in the gasket is different from the position for coupling the second anti-rotation pin in the gasket.

Further, the heat insulation structure further includes a rivet and a rivet sleeve; the brake block is provided with a mounting hole for mounting the rivet; the tail of the rivet protrudes from the brake block and then is sequentially extended through the gasket, the heat insulation washer, the Belleville spring and the rivet sleeve; or, the tail of the rivet protrudes from the brake block and then is sequentially extended through the heat insulation washer, the gasket, the Belleville spring and the rivet sleeve.

Further, the brake block includes a friction block and a static sheet steel back which are fixedly mounted together, and a plurality of anti-rotation pins are arranged between the static sheet steel back and the brake pad frame.

Further, the heat conduction coefficient of the heat insulation structure is smaller than that of the material adopted for each component included in the heat insulation structure.

The present invention has the following beneficial effects:

1. By the cooperative design of the spiral compression spring and the stepped counterbores, under the action of elasticity of the spring, the brake block assembly compresses the Belleville spring, and the Belleville spring abuts against the surface of the brake pad steel back. In this case, the 18 brake block assemblies all have a spring tension effect, and even if parts have machining errors, the brake block assemblies are tensioned and not free, so that the requirement for the machining precision of the parts is reduced and the production cost is lowered; the other remarkable progress is as follows: the surfaces of the 18 friction blocks can be ensured to be flush at any time, which is beneficial to ensuring the friction area and improving the braking efficiency;

2. By cooperative design of the spiral compression spring and the Belleville spring, the Belleville spring bears a pre-tightening pressure, and an appropriate pre-tightening force can obviously prolong the fatigue life of the Belleville spring by verification;

3. By designing the spiral compression spring, the Belleville spring, the elastic check ring and other structures, the elastic adjustable brake pad for a train has the advantages that the braking clearance is automatically adjusted, the friction effect is strengthened, installation and maintenance are convenient and the machining cost is low;

4. By combined design of the structures, e.g., modularized design of the brake block and the brake block assembly, after the brake block assembly is assembled, the rivet sleeve is extended through the fourth through hole, at the same time, an anti-rotation pin is put between the brake pad steel back blind hole and the static sheet steel back, then the spiral compression spring and the elastic check ring are sleeved, the elastic check ring is embedded into the clamping groove of the rivet sleeve, and the brake block assembly, the spiral compression spring and the brake pad steel back are connected together via the elastic check ring, so that the assembly efficiency of the whole structure is remarkably improved; moreover, in the using process, the working efficiency is also greatly improved during disassembly, replacement and maintenance, and this effect is particularly important for a train having high requirement for the maintenance time.

Figure 1:
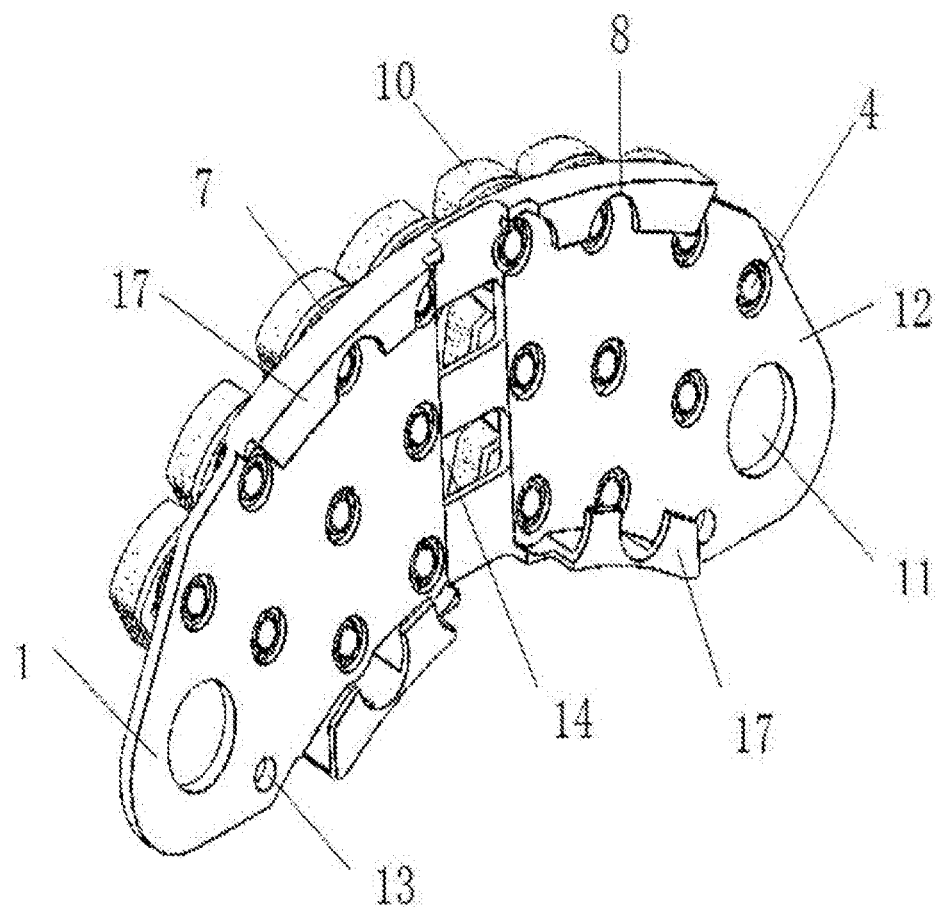
FIG. 1 is a schematic diagram of a three-dimensional structure of an elastic adjustable brake pad for a train according to the present invention.
Figure 2:
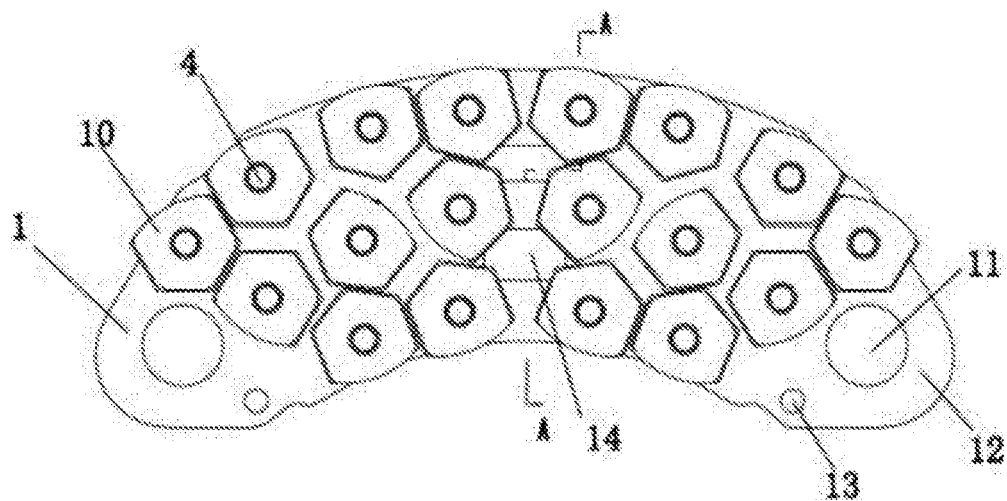
FIG. 2 is a front view of the elastic adjustable brake pad for a train according to the present invention.
Figure 3:
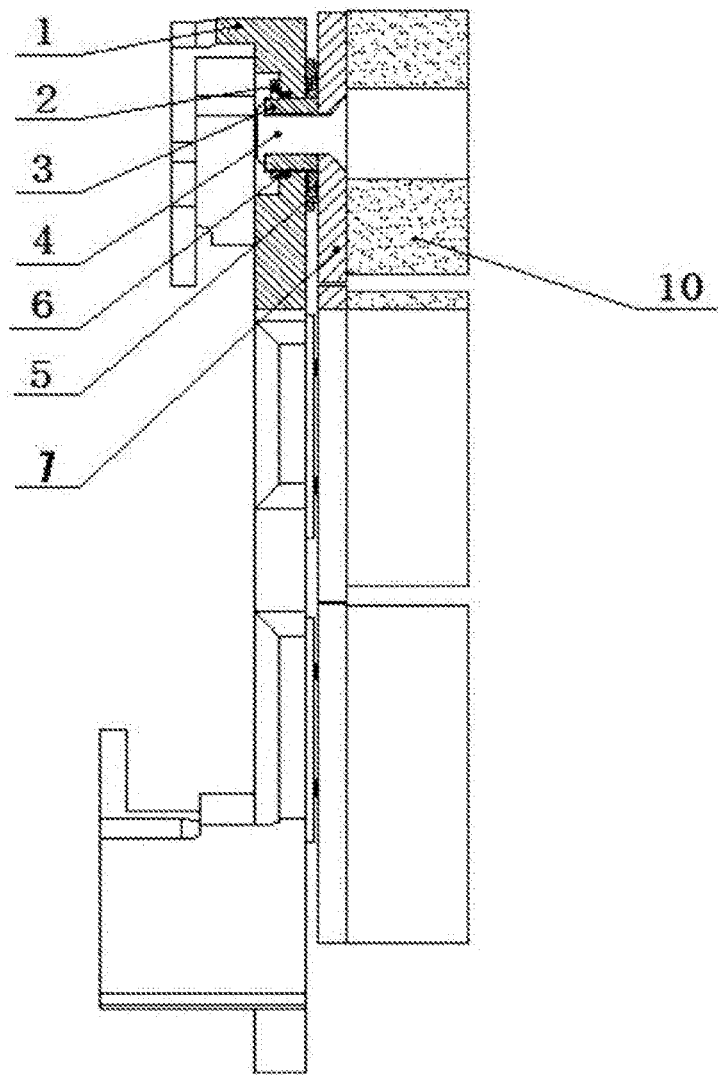
FIG. 3 is a section view along a line A-A in FIG. 2.
Figure 4:
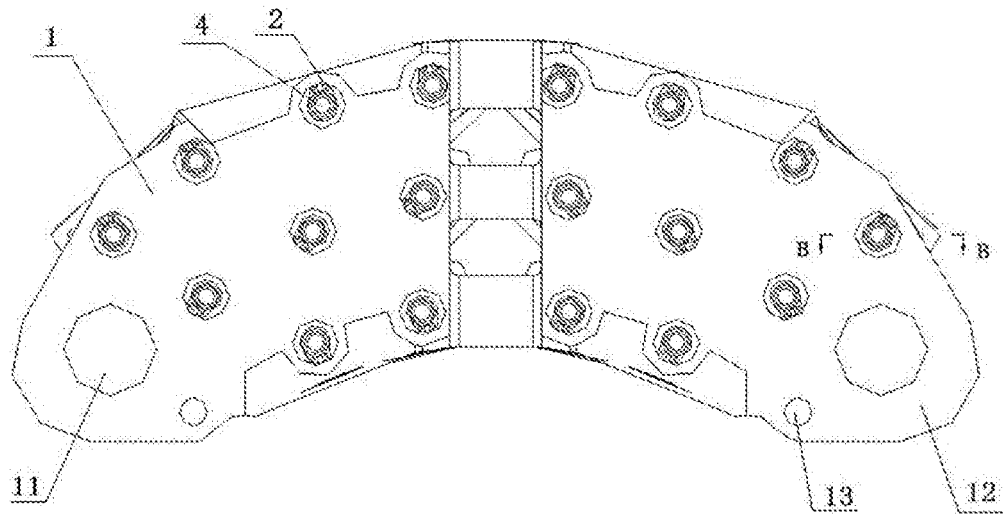
FIG. 4 is a rear view of the elastic adjustable brake pad for a train according to the present invention.
Figure 5:
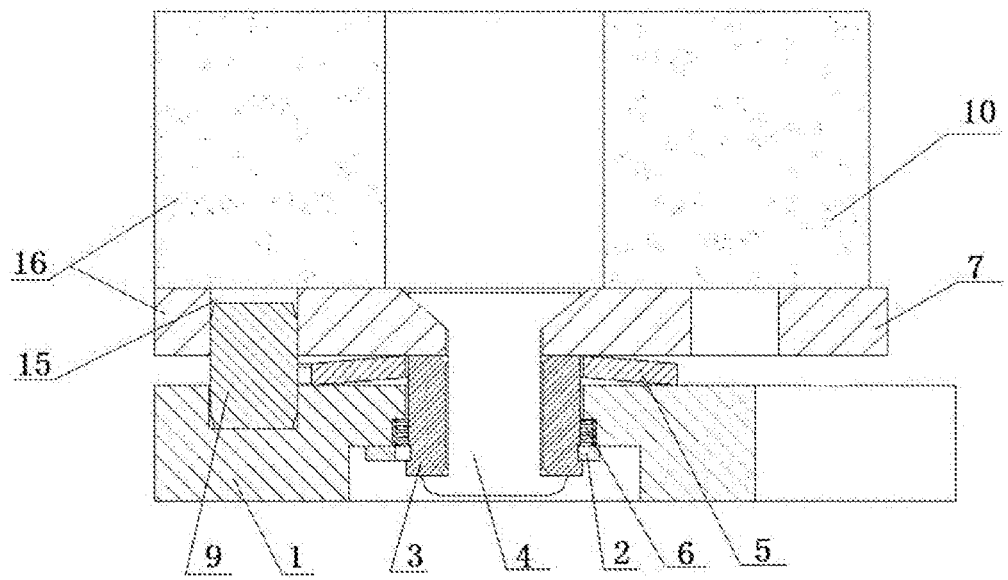
FIG. 5 is a section view along a line B-B in FIG. 4.
Figure 6:
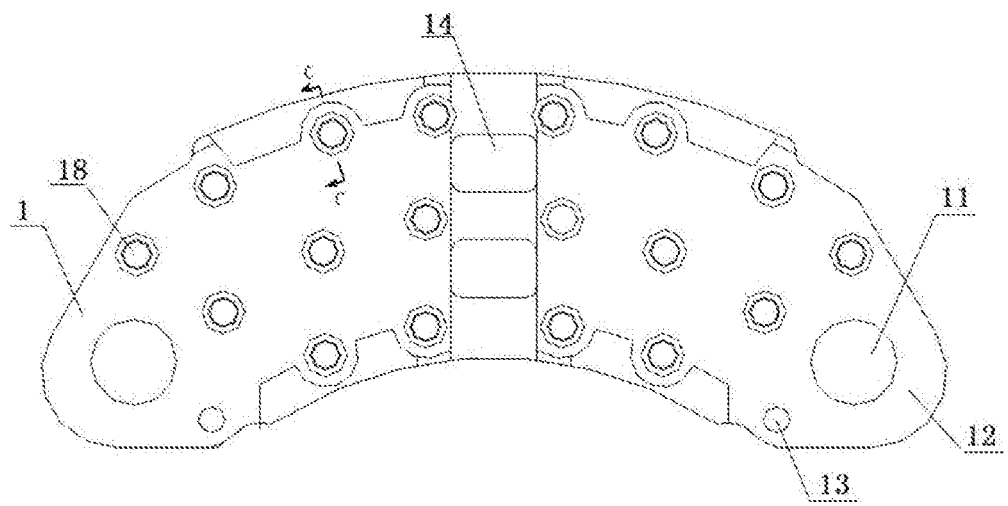
FIG. 6 is a rear view of a brake pad frame in the elastic adjustable brake pad for a train according to the present invention.
Figure 7:
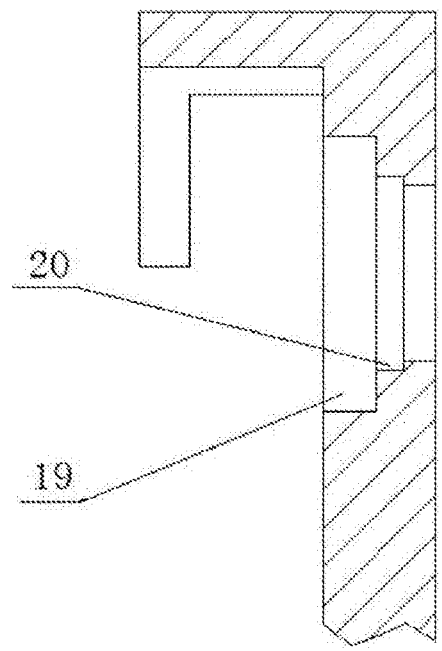
FIG. 7 is a section view along a line C-C in FIG. 6.
Figure 8:
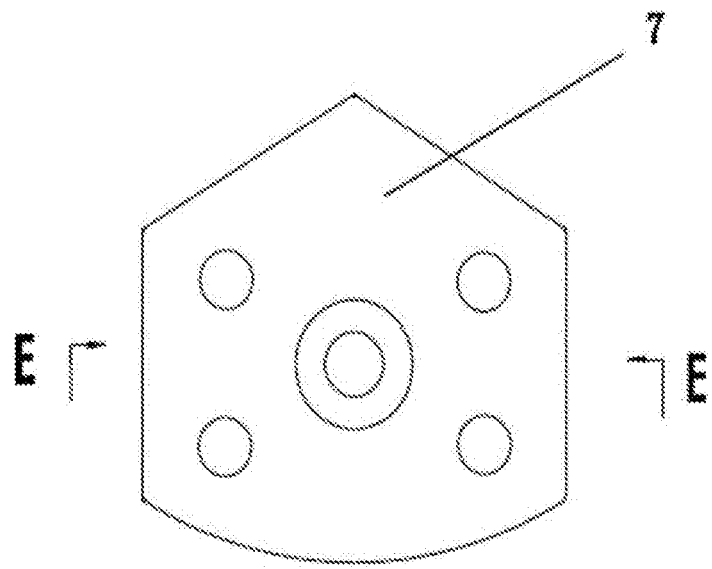
FIG. 8 is a front view of a static sheet steel back in the elastic adjustable brake pad for a train according to the present invention.
Figure 9:
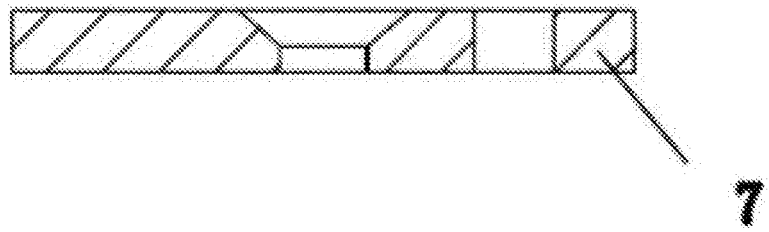
FIG. 9 is a section view along a line E-E in FIG. 8.
Figure 10:
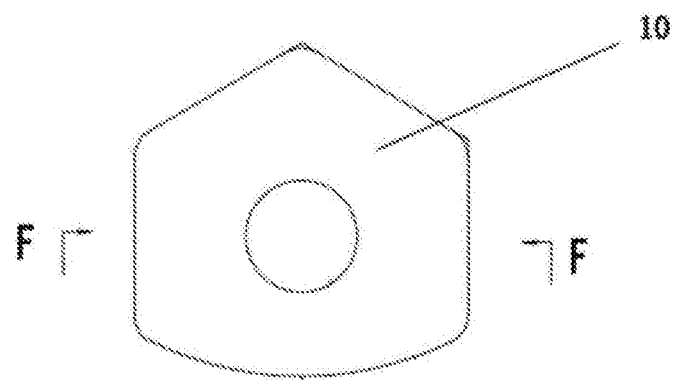
FIG. 10 is a front view of a friction block in the elastic adjustable brake pad for a train according to the present invention.
Figure 11:
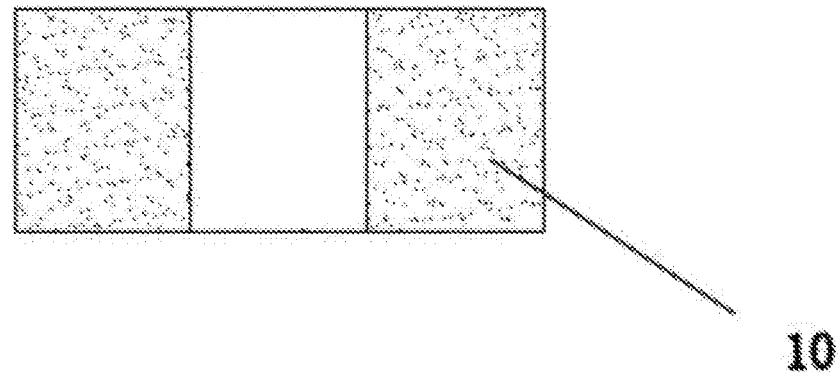
FIG. 11 is a section view along a line F-F in FIG. 10.
Figure 12:
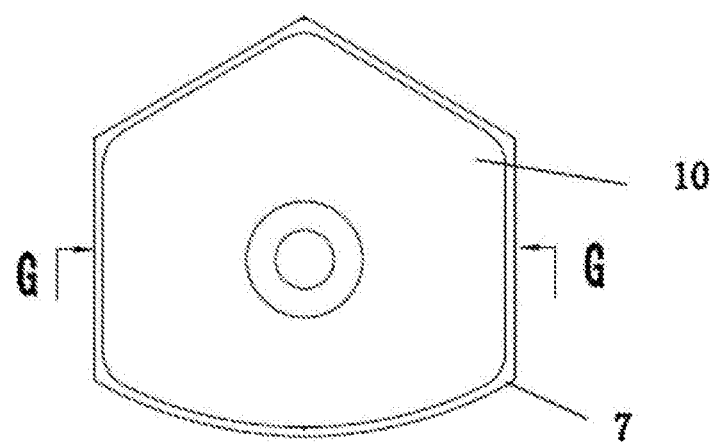
FIG. 12 is a structural front view showing installation of the static sheet steel back and the friction block in the elastic adjustable brake pad for a train according to the present invention.
Figure 13:
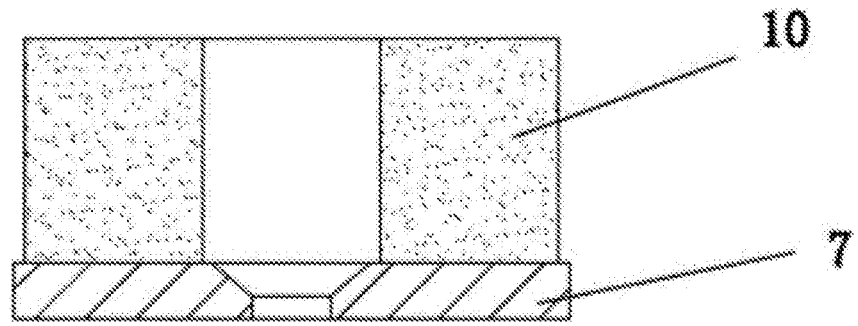
FIG. 13 is a section view along a line G-G in FIG. 12.
Figure 14:
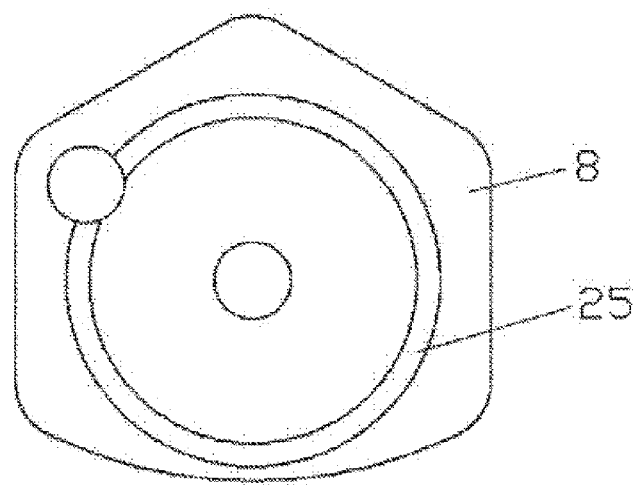
FIG. 14 is a schematic diagram of a gasket in the elastic adjustable brake pad for a train according to the present invention.
Figure 15:
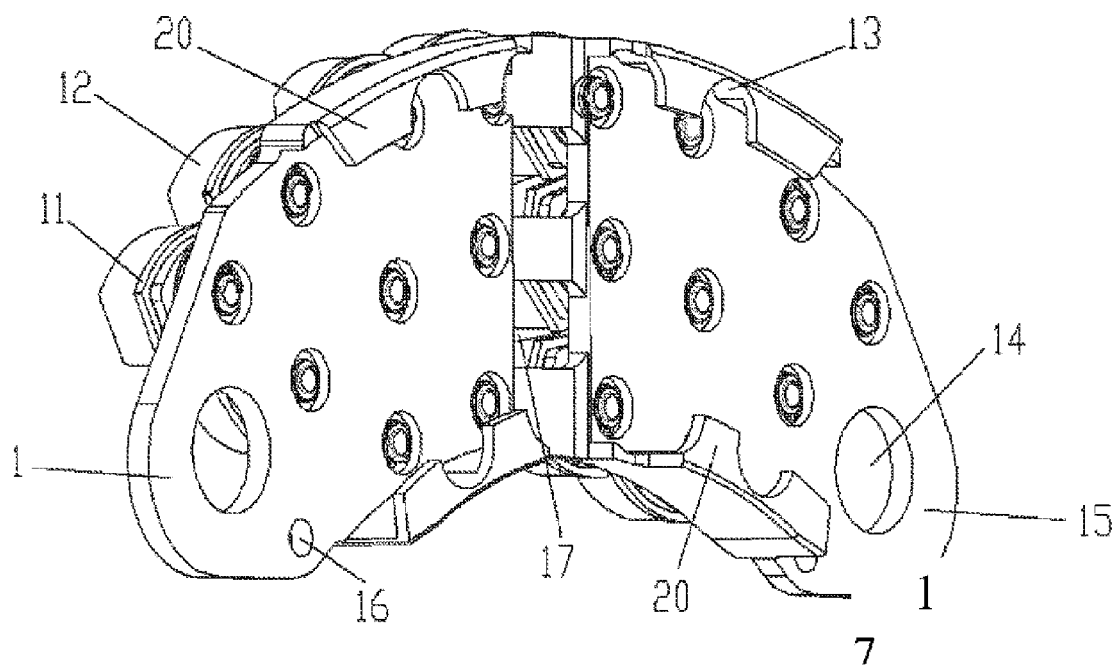
FIG. 15 is a schematic diagram of a three-dimensional structure of the elastic adjustable brake pad for a train according to the present invention.
Figure 16:
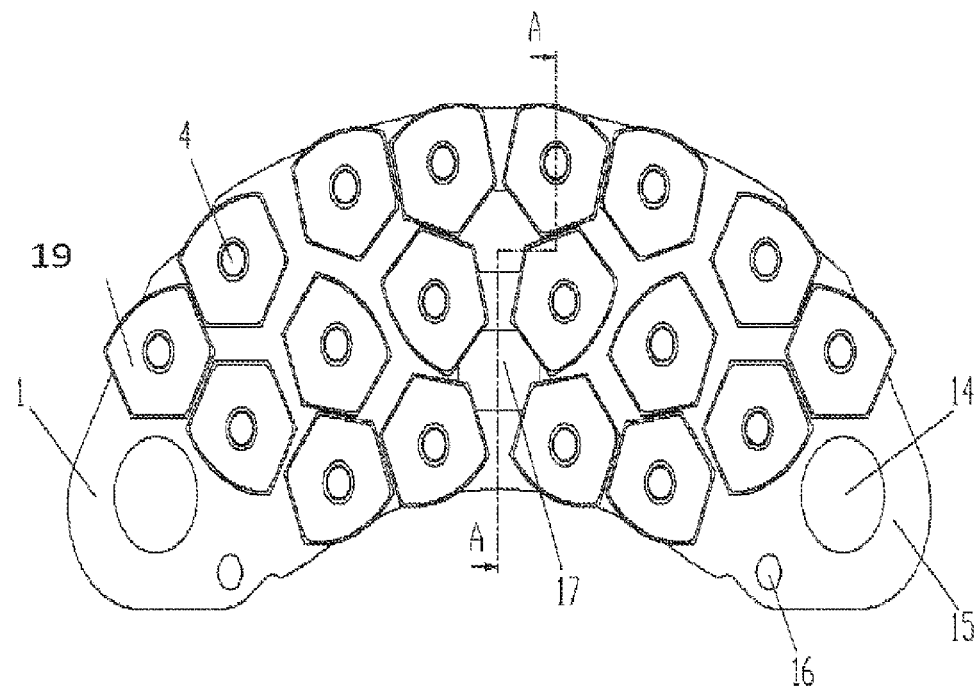
FIG. 16 is a front view of the elastic adjustable brake pad for a train according to the present invention.
Figure 17:
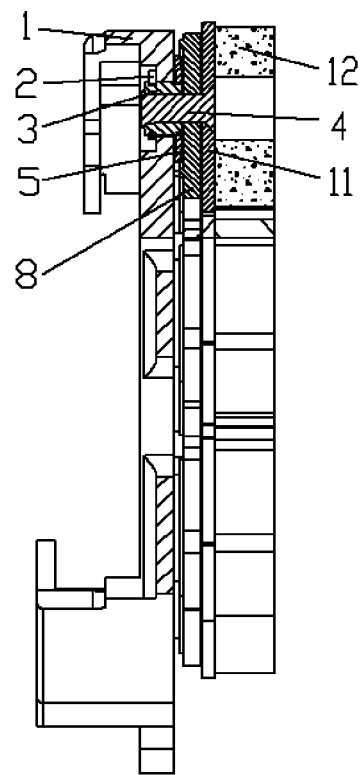
FIG. 17 is a section view along a line A-A in FIG. 16.
Figure 18:
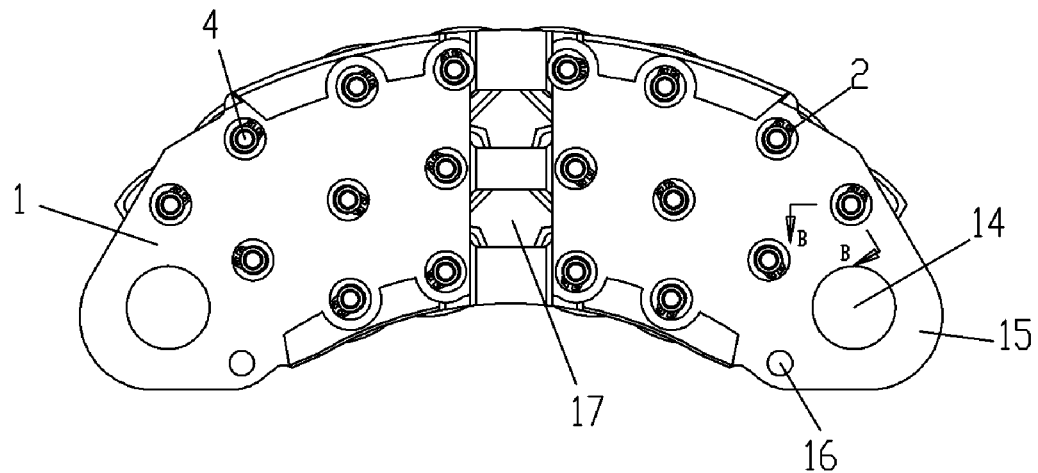
FIG. 18 is a rear view of the elastic adjustable brake pad for a train according to the present invention.
Figure 19:
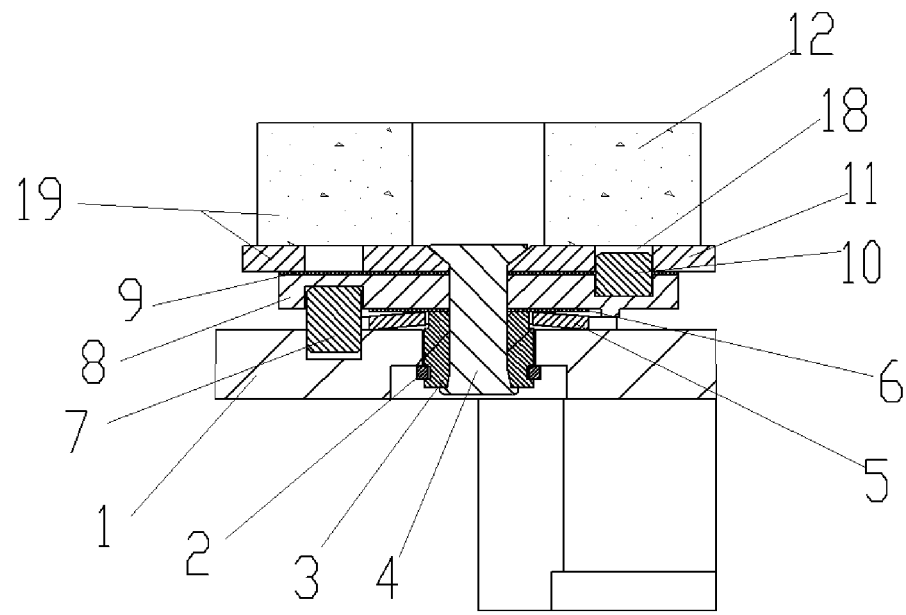
FIG. 19 is a section view along a line B-B in FIG. 16.
Figure 20:
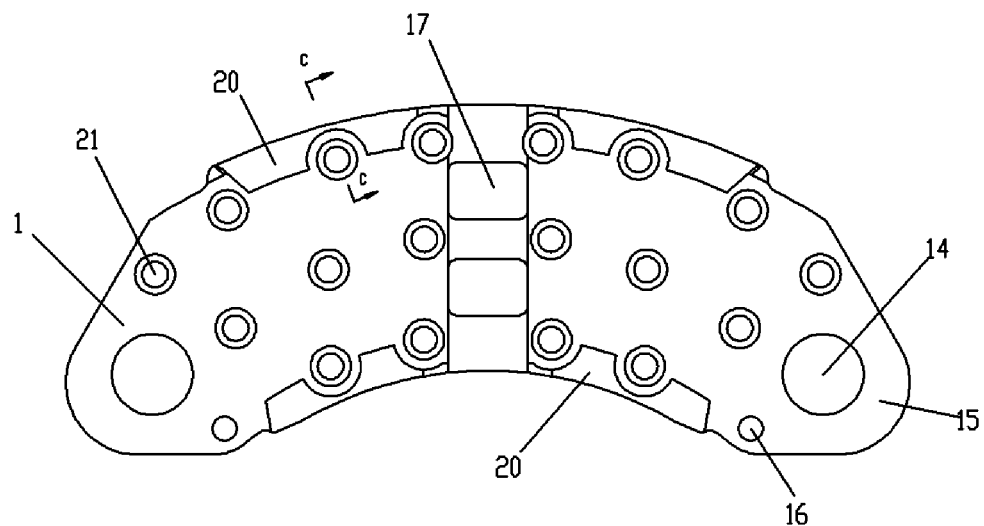
FIG. 20 is a rear view of a brake pad frame in the elastic adjustable brake pad for a train according to the present invention.
Figure 21:
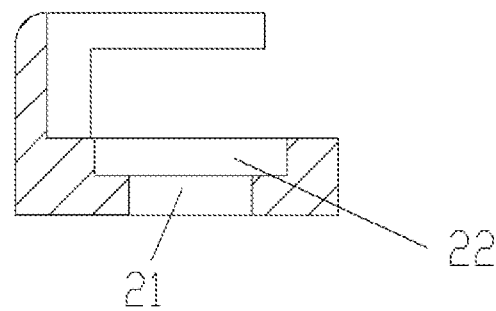
FIG. 21 is a section view along a line C-C in FIG. 20.
Figure 22:
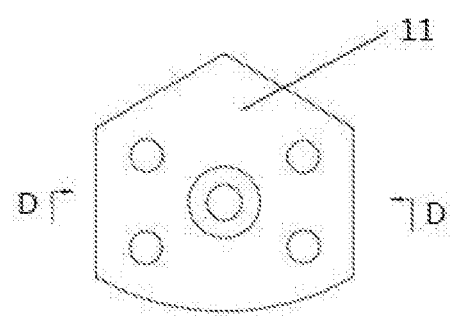
FIG. 22 is a front view of a static sheet steel back in the elastic adjustable brake pad for a train according to the present invention.
Figure 23:
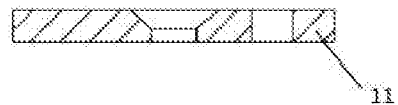
FIG. 23 is a section view along a line D-D in FIG. 22.
Figure 24:
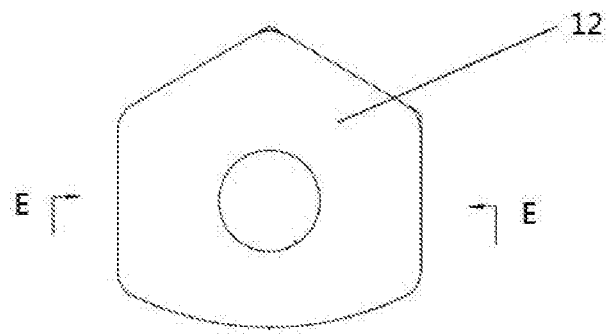
FIG. 24 is a front view of a friction block in the elastic adjustable brake pad for a train according to the present invention.
Figure 25:
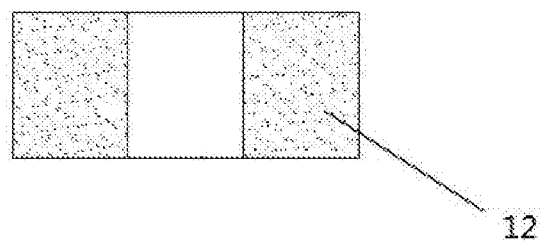
FIG. 25 is a section view along a line E-E in FIG. 24.
Figure 26:
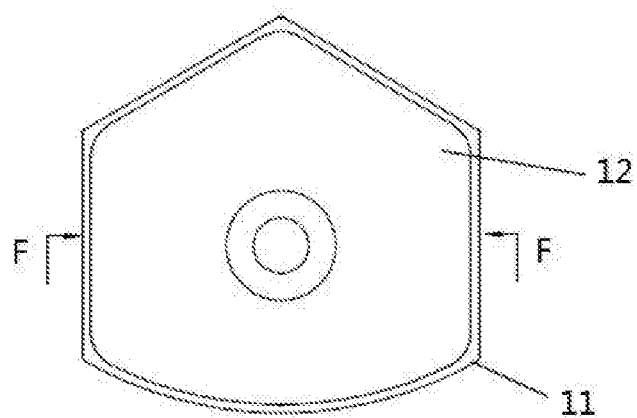
FIG. 26 is a structural front view showing installation of the static sheet steel back and the friction block in the elastic adjustable brake pad for a train according to the present invention.
Figure 27:
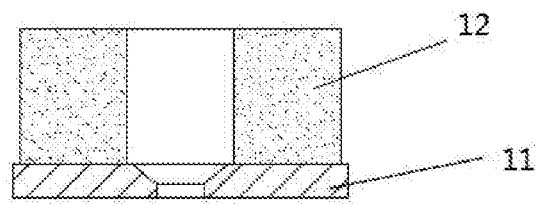
FIG. 27 is a section view along a line F-F in FIG. 26.

Reference numerals used in the solutions corresponding to FIGS. 1-13 are as follows:

1—brake pad frame, 2—elastic check ring, 3—rivet sleeve, 4—rivet, 5—Belleville spring, 6—spiral compression spring, 7—static sheet steel back, 8—semicircular groove, 9—anti-rotation pin, 10—friction block, 11—first through hole, 12—arc-shaped structure, 13—second through hole, 14—third through hole, 15—anti-rotation pin hole, 16—brake block, 17—connection part, 18—fourth through hole, 19—primary counterbore, 20—secondary counterbore.

Reference numerals used in the solutions corresponding to FIGS. 14-32 are as follows:

Signs of all the components in the schematic diagram of the brake pad 100 can be as follows:

1—brake pad frame, 2—elastic check ring, 3—rivet sleeve, 4—rivet, 5—Belleville spring, 6—first heat insulation washer, 7—first anti-rotation pin, 8—gasket, 9—second heat insulation washer, 10—second anti-rotation pin, 11—static sheet steel back, 12—friction block, 13—semicircular groove, 14—first through hole, 15—arc-shaped structure, 16—second through hole, 17—third through hole, 18—anti-rotation pin hole, 19—brake block, 20—connection part, 21—fourth through hole, 22—counterbore, 23—heat insulation structure, 24—heat insulation washer, 25—boss.

DETAILED DESCRIPTION OF THE EMBODIMENTS

The present invention will be further described in detail below in combination with the accompanying drawings and specific embodiments.

As shown in FIGS. 1-13, an elastic adjustable brake pad for a train includes a brake pad frame 1 provided with 18 fourth through holes 18, the brake pad frame 1 is of a semi-ring plate structure, connection parts 17 bent towards the center line of the semi-ring plate structure are respectively formed on the inner lateral surface and the outer lateral surface of the semi-ring plate structure, a semicircular groove 8 having an opening towards the center line of the semi-ring plate structure is formed in the center of a side surface of each of the connection parts 17, both ends of the brake pad frame 1 are of arc-shaped structures 12, a first through hole 11 is formed in the center of each of the arc-shaped structures 12, each of the arc-shaped structures 12 is provided with a second through hole 13 adjacent to its inner side, two square third through holes 14 are formed at the center of the brake pad frame 1, and the brake pad further includes a brake block assembly and a spiral compression spring 6; the brake block assembly includes a brake block 16, a rivet 4, a Belleville spring 5 and a rivet sleeve 3; the brake block 16 includes a friction block 10 and a static sheet steel back 7 which are fixedly mounted together, a mounting hole for mounting the rivet 4 is formed in the center of the brake block 16, and the tail of the rivet 4 protrudes from a surface of the brake block 16 where the static sheet steel back 7 is located, and then is sequentially extended through the Belleville spring 5 and the rivet sleeve 3; the fourth through holes 18 are stepped counterbores, and the stepped counterbore is formed by providing a secondary counterbore 20 in a primary counterbore 19; the rivet sleeve 3 in each brake block assembly is extended through the fourth through hole 18 and out of the primary counterbore 19, the spiral compression spring 6 is disposed surrounding the rivet sleeve 3, a clamping groove for clamping an elastic check ring 2 is formed in the outer side of one end of the rivet sleeve 3, one end of the spiral compression spring 6 abuts against the step where the secondary counterbore 20 is located, and the other end of the spiral compression spring 6 abuts against the lower end face of the elastic check ring 2; and a plurality of anti-rotation pins 9 are arranged between the static sheet steel back 7 and the brake pad frame 1.

The anti-rotation pins 9 are arranged in anti-rotation pin holes, which each are formed by positioning holes in the static sheet steel back 7 and blind holes in the brake pad frame 1 which are corresponding to the positioning holes.

The static sheet steel back 7 is provided with a plurality of the positioning holes, which are evenly distributed around the center of the static sheet steel back 7; and in the brake block assembly, the positioning holes are located outside the circumference of the Belleville spring 5.

The friction block 10 and the static sheet steel back 7 are gengons corresponding to each other, which each have five lateral surfaces, one of which is a convex cambered surface, and the other four lateral surfaces of which are planes.

Anti-wear grains are formed on the outside end face of the friction block 10.

The anti-wear grains on the outside end face of the friction block 10 are distributed radially with the center of the friction block 10 as a center.

The friction block 10 and the static sheet steel back 7 are bonded together by sintering to form the brake block 16.

The side length of the friction block 10 is shorter than that of the static sheet steel back 7.

The friction block 10 is made of a metal-based powder material. The metal-based powder material is a copper-based metallurgical powder material.

In order to ensure the reliability of the Belleville spring so as to keep enough strength and elasticity thereof in the life cycle of the brake pad and then ensure the validity of the elastic adjustment function of the brake pad, the present invention provides another elastic adjustable brake pad 100 for a train.

The elastic adjustable brake pad 100 for a train includes a brake pad frame 1, the brake pad frame 1 is of a semi-ring plate structure, connection parts 20 bent towards the center line of the semi-ring plate structure are respectively formed on the inner lateral surface and the outer lateral surface of the semi-ring plate structure, a semicircular groove 13 having an opening towards the center line of the semi-ring plate structure is formed in the center of a side surface of each of the connection parts 20, both ends of the brake pad frame 1 are of arc-shaped structures 15, a first through hole 14 is formed in the center of each of the arc-shaped structures 15, each of the arc-shaped structures 15 is provided with a second through hole 16 adjacent to its inner side, a third through hole 17 is formed at the center of the brake pad frame 1, and the brake pad is characterized by further including a heat insulation structure 23, wherein:

The heat insulation structure 23 includes a brake block 19, a Belleville spring 5, as well as a heat insulation washer 24 and a gasket 8 between the brake block 19 and the Belleville spring 5, that is to say, the heat insulation structure 23 is of a multilayer structure including a brake block 19, a Belleville spring 5, a heat insulation washer 24 and a gasket 8.

A boss 25 integrated with the gasket 8 is formed on the surface, facing the Belleville spring 5, of the gasket 8, the inner diameter of the boss 25 is greater than or equal to the outer diameter of the Belleville spring 5, the height of the boss 25 is smaller than a first thickness and greater than a thickness variation, where the first thickness refers to the thickness of the Belleville spring 5 under the maximum compression, and the thickness variation is a difference between the first thickness and a second thickness which refers to the thickness of the Belleville spring 5 when the Belleville spring 5 is not compressed. Thus, the boss 25 can play a role in protecting the Belleville spring 5, thus preventing the Belleville spring 5 from dropping due to damage, wherein the boss 25 can be understood by referring to FIG. 14.

In the embodiment of the present invention, an air film can be formed between adjacent components in the heat insulation structure 23, and can effectively prevent heat on the friction surface during braking from being conducted to one side of the Belleville spring 5.

In the embodiment of the present invention, FIGS. 15-27 give schematic diagrams of the elastic adjustable brake pad 100 for a train as proposed by the embodiment of the present invention and part of components therein, and the elastic adjustable brake pad 100 for a train as proposed by the present invention and part of components therein can be understood by referring to FIGS. 15-27.

In the embodiment of the present invention, the quantity of the heat insulation washer 24 may be one or more, and when only one washer is included, the heat insulation washer may be located between the gasket 8 and the brake block 19 or between the gasket 8 and the Belleville spring 5, which is not specifically limited herein.

In the embodiment of the present invention, optionally, the heat insulation washer 24 includes a first heat insulation washer 6 and a second heat insulation washer 9, the first heat insulation washer 6 is located between the Belleville spring 5 and the gasket 8, and the second heat insulation washer 9 is located between the brake block 19 and the gasket 8.

In the embodiment of the present invention, optionally, the first heat insulation washer 6 is matched with the Belleville spring 5 in shape, and the second heat insulation washer 9 is matched with the brake block 19 in shape.

Figure 28:
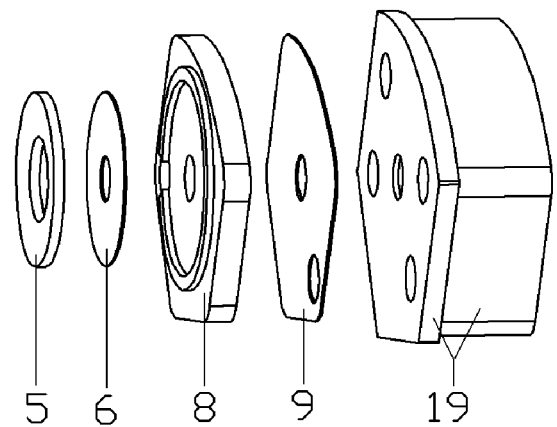
FIG. 28 is a schematic diagram of the elastic adjustable brake pad for a train, which includes a first heat insulation washer and a second heat insulation washer, according to the present invention.

In the embodiment of the present invention, optionally, the first heat insulation washer 6 is the same as the Belleville spring 5 in shape, and the second heat insulation washer 9 is the same as the brake block 19 in shape, as shown in FIG. 28.

In the embodiment of the present invention, in order to block conduction of heat, optionally, the heat insulation washer 24 and the gasket 8 are made of materials having heat conduction coefficients smaller than a threshold.

In the embodiment of the present invention, the heat insulation washer 24 and the gasket 8 are added to the heat insulation structure 23 compared with the previous brake block assembly, if one anti-rotation pin is adopted, the length of the anti-rotation pin is increased, thus, the torque borne by the anti-rotation pin having the length increased is large, the anti-rotation pin is easily bent, as a result, the elastic adjustable structure fails in braking, and in order to avoid the defects caused by the anti-rotation pin having the length increased, the present invention adopts double anti-rotation pins to replace the anti-rotation pin having the length increased, in this case, the length of the double anti-rotation pins is not increased, and the torque when the anti-rotation pins are stressed can thus be prevented from being increased.

That is to say, in the embodiment of the present invention, the brake pad 100 adopts double anti-rotation pins in order to prevent the brake block 19 from rotating in the working process to produce mutual extrusion and collision so as to further cause damage or drop of the friction block 12.

Figure 29:
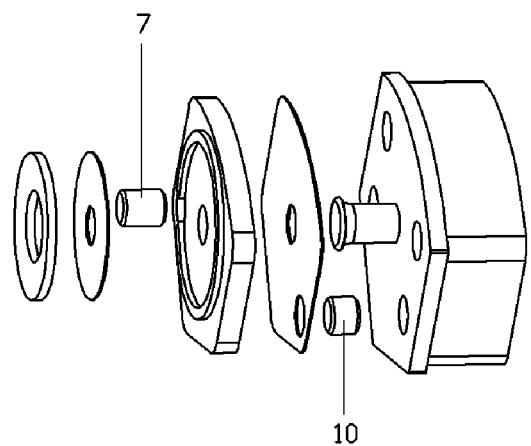
FIG. 29 is a schematic diagram of a double anti-rotation pin structure in the elastic adjustable brake pad for a train according to the present invention.

Referring to FIG. 29, the brake pad frame 1 is connected with the gasket 8 by a first anti-rotation pin 7, the gasket 8 is connected with the brake block 19 by a second anti-rotation pin 10, and the position for coupling the first anti-rotation pin 7 in the gasket 8 is different from the position for coupling the second anti-rotation pin 10 in the gasket 8.

That is to say, different anti-rotation pins are respectively adopted for positioning between the brake pad frame 1 and the gasket 8 and between the gasket 8 and the brake block 19, the second anti-rotation pin 10 can prevent the components in the heat insulation structure 23 from rotating relatively, and the first anti-rotation pin 7 can prevent the heat insulation structure 23 from rotating relative to the brake pad frame 1.

Meanwhile, the double anti-rotation pins adopted in the embodiment of the present invention can also avoid dislocation of each component in the heat insulation structure 23 before the heat insulation structure 23 and the brake pad frame 1 are assembled to affect the mounting and floating functions.

Figure 30:
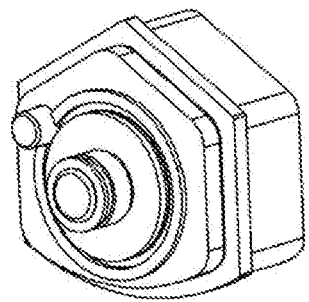
FIG. 30 is a schematic diagram of a heat insulation structure in the elastic adjustable brake pad for a train according to the present invention.

Referring to FIG. 30, provided is an assembled heat insulation structure 23.

In the embodiment of the present invention, optionally, the heat insulation structure 23 further includes a rivet 4 and a rivet sleeve 3; the brake block 19 is provided with a mounting hole for mounting the rivet 4;

The tail of the rivet 4 protrudes from the brake block 19 and then is sequentially extended through the gasket 8, the heat insulation washer 24, the Belleville spring 5 and the rivet sleeve 3; or, the tail of the rivet 4 protrudes from the brake block 19 and then is sequentially extended through the heat insulation washer 24, the gasket 8, the Belleville spring 5 and the rivet sleeve 3.

In the embodiment of the present invention, optionally, with the rivet 4 as a center, an anti-rotation pin can be arranged on the circle greater than the outer diameter of the Belleville spring 5, and because the double anti-rotation pin structure adopts the principle of two-point fixation, large-angle rotation of the components in the heat insulation structure 23, with the rivet 4 as a shaft, can be avoided.

In the embodiment of the present invention, optionally, the brake block 19 includes a friction block 12 and a static sheet steel back 11 which are fixedly mounted together, and a plurality of anti-rotation pins are arranged between the static sheet steel back 11 and the brake pad frame 1.

In the embodiment of the present invention, optionally, the heat conduction coefficient of the heat insulation structure 23 is smaller than that of the material adopted for each component included in the heat insulation structure 23.

In the embodiment of the present invention, the brake pad frame 1 may be provided with one or more fourth through holes 21, e.g., provided with 18 fourth through holes 21, of course, 18 is only a specific example, and the number is not specifically limited herein.

Figure 31:
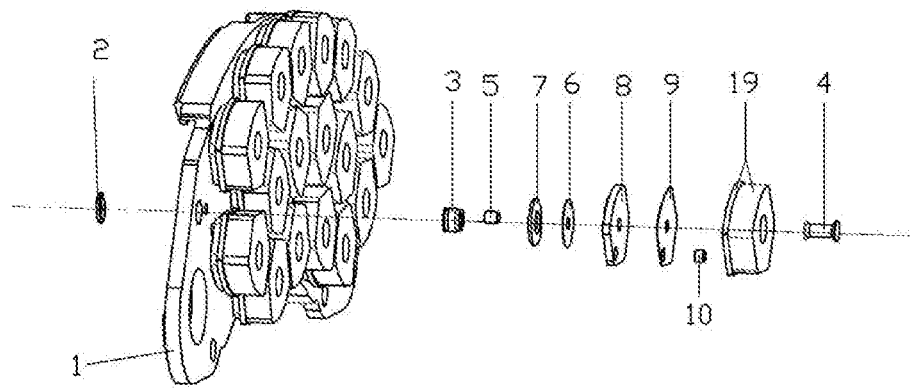
FIG. 31 is a schematic diagram of the elastic adjustable brake pad for a train according to the present invention.
Figure 32:
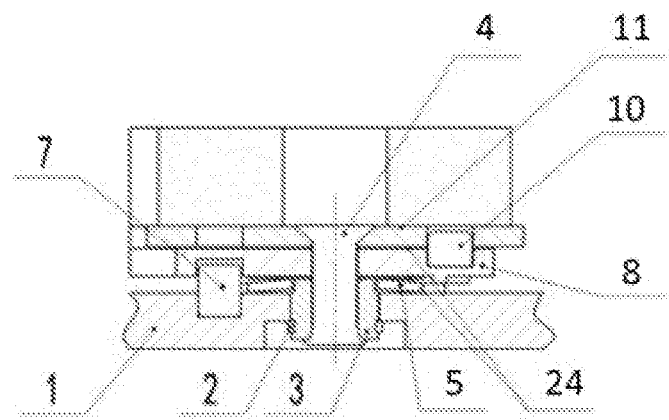
FIG. 32 is a partial schematic diagram of the elastic adjustable brake pad for a train according to the present invention.

In order to facilitate understanding on this solution, a specific schematic diagram of the elastic adjustable brake pad 100 for a train is further given in the embodiment of the present invention, as shown in FIG. 31 or 32.

Optionally, the elastic adjustable brake pad 100 for a train, provided in the embodiment of the present invention, can be assembled by the following method:

step 1: putting the rivet 4 through the center hole of the brake block 19;

step 2: putting the rivet 4 through the center hole of the second heat insulation washer 9;

step 3: putting the second anti-rotation pin 10 into the positioning holes of the second heat insulation washer 9 and the brake block 19;

step 4: putting the rivet 4 through the center hole of the gasket 8, and inserting the second anti-rotation pin 10 into a positioning blind hole of the gasket 8 (the positioning blind hole is located in the surface, where the boss is not formed, of the gasket 8);

wherein the second anti-rotation pin 10 located inside the heat insulation structure 23 cannot be observed from the outside;

step 5: putting the rivet 4 through the center hole of the first heat insulation washer 6;

step 6: putting the rivet 4 through the center hole of the Belleville spring 5;

wherein the convex surface of the Belleville spring 5 is in contact with the first heat insulation washer 6;

step 7: sleeving the rivet sleeve 3 on the rivet 4, and riveting them to form the integrated heat insulation structure 23;

step 8: inserting the first anti-rotation pin 7 into the anti-rotation pin hole of the brake pad frame 1;

step 9: putting the rivet sleeve 3 through the fourth through hole 21 of the brake pad frame 1, and inserting the first anti-rotation pin 7 into a positioning blind hole of the gasket 8; and step 10: mounting the elastic check ring 2 into the annular groove of the rivet sleeve 3 on the side, provided with the connection part 20, of the brake pad frame 1.

If the brake pad 100 is provided with a plurality of fourth through holes 21, steps 9 and 10 are repeated to complete the assembly of the whole brake pad 100. Of course, steps 1-10 are an example of assembling the brake pad 100, and in practical application, other methods may also be adopted, which is not specifically limited herein.

In some solutions, the assembly pre-tightening force is mainly given via the spiral compression spring to prevent the brake block assembly from being too loose on the brake pad frame 1 after assembly, thus preventing some components in the brake block assembly from being damaged by long-term impact shock. Although said defects can be solved to a certain degree via the spiral compression spring, some other defects are also brought about at the same time, e.g.:

1) the requirements for dimensional precision and performance of the spiral compression spring are relatively high, so the spiral compression spring is difficult to manufacture;

2) the requirement for the machining precision of the secondary counterbores is relatively high; and 3) during assembly, the elastic check ring 2 is relatively narrow and needs to play a role in clamping and preventing dropping, which requires a limited contact area with the spiral compression spring, so that their cooperation is difficult to control.

In order to avoid the defects caused by the spiral compression spring, the spiral compression spring is not adopted in the elastic adjustable brake pad 100 for a train as proposed in the embodiment of the present invention, but the purpose of pre-tightening is fulfilled by the elasticity of the Belleville spring 5.

The elastic adjustable brake pad 100 for a train as proposed in the embodiment of the present invention includes the following several main structures:

1) an elastic adjustment structure: a structure assembled from one or more heat insulation structures and the brake pad frame;

2) a heat insulation structure: a structure having multiple layers of air films formed by superposing the gasket, the brake block and the heat insulation washer; and 3) an anti-rotation structure: a structure in which the relative positions of the heat insulation structure and the brake block are fixed via the double anti-rotation pins and there is only small-angle rotation between the heat insulation structure and the brake pad frame at the same time.

The elastic adjustable brake pad 100 for a train as proposed in the embodiment of the present invention specifically has the following functional characteristics:
1) automatically elastically adjusting the braking clearance, and ensuring that the surface of the friction material can be in uniform contact with the surface of the brake disc to improve the braking efficiency;
2) effectively reducing the conduction of heat from the friction surface to the brake pad during braking, reducing the influence of heat on the brake pad frame and the components of the heat insulation structure, improving the reliability of the components, and then ensuring the safety in the life cycle of the brake pad; and
3) ensuring relatively fixed positions between the heat insulation structures during braking, and avoiding damage of the heat insulation structure or drop of the friction material due to mutual extrusion and collision of the components of the heat insulation structure.

The present invention is not limited to the above embodiments. Any modification, improvement and substitution that could be conceived by those skilled in the art without departing from the essential content of the present invention fall into the scope of the present invention.

The invention claimed is:

1. An elastic adjustable brake pad for a train, comprising a brake pad frame provided with at least one fourth through hole, wherein the brake pad frame is of a semi-ring plate structure, connection parts bent towards a center line of the semi-ring plate structure are respectively formed on an inner lateral surface and an outer lateral surface of the semi-ring plate structure, a semicircular groove having an opening towards the center line of the semi-ring plate structure is formed in the center of a side surface of each of the connection parts, both ends of the brake pad frame are of arc-shaped structures, a first through hole is formed in the center of each of the arc-shaped structures, each of the arc-shaped structures is provided with a second through hole adjacent to its inner side, two third through holes of a square shape are formed at the center of the brake pad frame, and the brake pad is characterized by further comprising at least one brake block assembly and at least one spiral compression spring, wherein the at least one brake block assembly comprises a brake block, a rivet, a Belleville spring and a rivet sleeve; the brake block comprises a friction block and a static sheet steel back which are fixedly mounted together, a mounting hole for mounting the rivet is formed in the center of the brake block, and a tail of the rivet protrudes from a surface of the brake block where the static sheet steel back is located, and then is sequentially extended through the Belleville spring and the rivet sleeve; the at least one fourth through hole is a stepped counterbore formed by providing a secondary counterbore in a primary counterbore; the rivet sleeve in the at least one brake block assembly is extended through the at least one fourth through hole and out of the primary counterbore, the at least one spiral compression is disposed surrounding the rivet sleeve, a clamping groove for clamping an elastic check ring is formed in the outer side of one end of the rivet sleeve, one end of the at least one spiral compression spring abuts against the step where the secondary counterbore is located, and the other end of the at least one spiral compression spring abuts against the lower end face of the elastic check ring; and a plurality of anti-rotation pins are arranged between the static sheet steel back and the brake pad frame.

2. The elastic adjustable brake pad for a train according to claim 1, wherein the anti-rotation pins are arranged in anti-rotation pin holes, which each are formed by positioning holes in the static sheet steel back and blind holes in the brake pad frame which are corresponding to the positioning holes.

3. The elastic adjustable brake pad for a train according to claim 2, wherein the static sheet steel back is provided with a plurality of the positioning holes which are evenly distributed around the center of the static sheet steel back; and in the brake block assembly, the positioning holes are located outside the circumference of the Belleville spring.

4. The elastic adjustable brake pad for a train according to claim 1, wherein the friction block and the static sheet steel back are gengons corresponding to each other, which each have five lateral surfaces, one of which is a convex cambered surface, and the other four lateral surfaces of which are planes.

5. The elastic adjustable brake pad for a train according to claim 1, wherein anti-wear grains are formed on an outside end face of the friction block.

6. The elastic adjustable brake pad for a train according to claim 5, wherein the anti-wear grains on the outside end face of the friction block are distributed radially with the center of the friction block as a center.

7. The elastic adjustable brake pad for a train according to claim 1, wherein the friction block and the static sheet steel back are bonded together by sintering to form the brake block.

8. The elastic adjustable brake pad for a train according to claim 7, wherein a side length of the friction block is shorter than that of the static sheet steel back.

9. The elastic adjustable brake pad for a train according to claim 1, wherein the friction block is made of a metal-based powder material.

10. The elastic adjustable brake pad for a train according to claim 9, wherein the metal-based powder material is a copper-based metallurgical powder material.

* * * * *